US011897253B2

(12) United States Patent
Tsukui et al.

(10) Patent No.: US 11,897,253 B2
(45) Date of Patent: Feb. 13, 2024

(54) ILLUMINATION CONTROL METHOD OF LED LAMP FOR INK-JET PRINTER

(71) Applicant: MUTOH INDUSTRIES LTD., Tokyo (JP)

(72) Inventors: Yoshiyuki Tsukui, Suwa-gun Nagano (JP); Yoshio Asami, Suwa-gun Nagano (JP)

(73) Assignee: MUTOH INDUSTRIES LTD., Tokyo (JP)

( * ) Notice: Subject to any disclaimer, the term of this patent is extended or adjusted under 35 U.S.C. 154(b) by 43 days.

(21) Appl. No.: 17/786,845

(22) PCT Filed: Dec. 21, 2020

(86) PCT No.: PCT/JP2020/047623
§ 371 (c)(1),
(2) Date: Jun. 17, 2022

(87) PCT Pub. No.: WO2021/132130
PCT Pub. Date: Jul. 1, 2021

(65) Prior Publication Data
US 2023/0034155 A1 Feb. 2, 2023

(30) Foreign Application Priority Data
Dec. 25, 2019 (JP) ................................ 2019-234976

(51) Int. Cl.
*B41J 11/00* (2006.01)

(52) U.S. Cl.
CPC .... *B41J 11/00212* (2021.01); *B41J 11/00214* (2021.01)

(58) Field of Classification Search
CPC ........... B41J 11/00212; B41J 11/00214; B41J 11/00218; B41J 11/0021
See application file for complete search history.

(56) References Cited

U.S. PATENT DOCUMENTS

2013/0293609 A1* 11/2013 Ohkawa .................... B41J 2/01 347/9

* cited by examiner

*Primary Examiner* — Bradley W Thies
(74) *Attorney, Agent, or Firm* — Wenderoth, Lind & Ponack, L.L.P.

(57) ABSTRACT

An illumination control method of LED lamps for ink-jet printers including a recording head in which ink discharge printing ranges are formed in a printing direction and an LED lamp in which light emitting diodes are arranged at a rear side of the recording head with respect to the printing direction. In an ink-jet printer in which the light-emitting diodes are divided into plural areas and the light amount for each area can be individually controlled by a controller, and among the light-emitting diodes, the light amount of the light-emitting diode that first scans a glossy printed surface is set to a light amount that does not cause ink curing. The light amount of the light-emitting diode of the area that first scans is set so the total light amount on the glossy printed surface is less than or equal to the critical exposure amount of the integrated illuminance.

9 Claims, 18 Drawing Sheets

MEASUREMENT LEDLAMP ILLUMINANCE DISTRIBUTION

MEASURE THE ILLUMINANCE DISTRIBUTION OF EACH LED MODULE.
THE TOTAL ILLUMINANCE DISTRIBUTION IS THE SUM.

LEDSUM=LED1 +LED2+ ... +LED6

ILLUMINATION CONTROL METHOD OF LED LAMP FOR INK-JET PRINTER

TECHNICAL FIELD

This invention relates to a method of controlling LED (ultraviolet light emitting diode) lamps for ink-jet printers, and more particularly to a method of controlling LED lamps to achieve a glossy surface on a UV ink printed surface.

BACKGROUND ART

In ink-jet printers using UV inks (UV-curable inks), when glossy printing of the surface of printed materials is required, a method is employed to cure the ink by delaying the time until the UV light is illuminated on the ink (glossy printing). In addition, by dividing and controlling the LED lamps, a boundary part of divided LED modules is controlled to obtain good results (see, for example, the Patent Publication 1).

PRIOR ART PUBLICATION

Patent Publication

Patent Publication 1: Published Examined Patent Application U.S. Pat. No. 6,074,250

SUMMARY OF THE INVENTION

Problems to be Solved by the Invention

In ink-jet printers, various printing specifications are available as needed, and when performing printing in which nozzles of an inkjet printhead are divided into multiple nozzles, the divided printing width does not always match the divided width of the LED lamps. In addition, since an illuminated light diffuses, it also diffuses to the area where the illumination is desired to be suppressed when illuminating the boundary of the divided printing width, which affects the curing of the ink, thus requiring detailed control of the illumination intensity. Therefore, it is not easy to control LED lamps to achieve good glossy printing.

It is an objective of the present invention to solve the above disadvantages.

Means for Solving the Problem

In order to achieve the above objective, the present invention includes a recording head in which a plurality of ink discharge printing ranges are formed in a printing direction and an LED lamp in which a plurality of divided UV light emitting diodes are arranged in the front-back direction with respect to the printing direction, wherein in an ink-jet printer in which the light amount of the divided UV light emitting diodes can be individually controlled by a controller, and among the divided UV light emitting diodes, the light amount of the divided UV light emitting diode that first scans a glossy printed surface is set to a light amount that does not cause ink curing (critical exposure amount or less), and the light amount of the other divided UV light emitting diodes is set to a light amount that causes ink curing, the light amount of the divided UV light emitting diodes is set so that the integrated illuminance, which is the total light amount (total) on the glossy printed surface, is less than or equal to the critical exposure amount.

The invention is also characterized in that a glossy printed surface is formed with a varnish ink, namely transparent ink (clear ink), and one or more ink layers are formed under the varnish ink layer.

The invention is also characterized in that the critical exposure amount is the minimum exposure amount required to cure the UV-curable ink and is set on the basis of the curing characteristic curve of the UV-curable ink.

According to the present invention, the setting of the light amount of the divided UV light-emitting diodes is carried out through: a first process of measuring the illuminance distribution on a printed surface of each of the divided UV light-emitting diodes by driving an LED lamp of a test ink-jet printer; a second process of obtaining, using the data measured in the first process, an integrated illuminance distribution of each of the divided UV light-emitting diodes with respect to the illuminance on the printed surface, and an integrated illuminance distribution of the entire LED lamp on the printed surface through summation of the integrated illuminance distributions; a third process of adjusting the illuminance of each of the divided UV light-emitting diodes on the printed surface on the basis of the integrated illuminance distribution; and a fourth process of setting the light amount of each of the divided UV light emitting diode in such a way that the integrated illuminance on a gloss-printed surface is no greater than a critical amount of exposure.

Effect of the Invention

According to the present invention, using the integrated illuminance distribution to create light amount setting data for each divided LED lamp area enables to easily set the light amount for each divided LED (ultraviolet light-emitting diode) lamp area and glossy printing compatible with various printing specifications. Furthermore, the light amount can be set for each area in consideration of the critical exposure amount, enabling appropriate light amount settings in areas where areas to be cured and areas not to be cured are adjacent to each other.

EMBODIMENT FOR CARRYING OUT THE INVENTION

The following section will describe the configuration of the present invention in detail with reference to the attached drawings.

Figure 1:
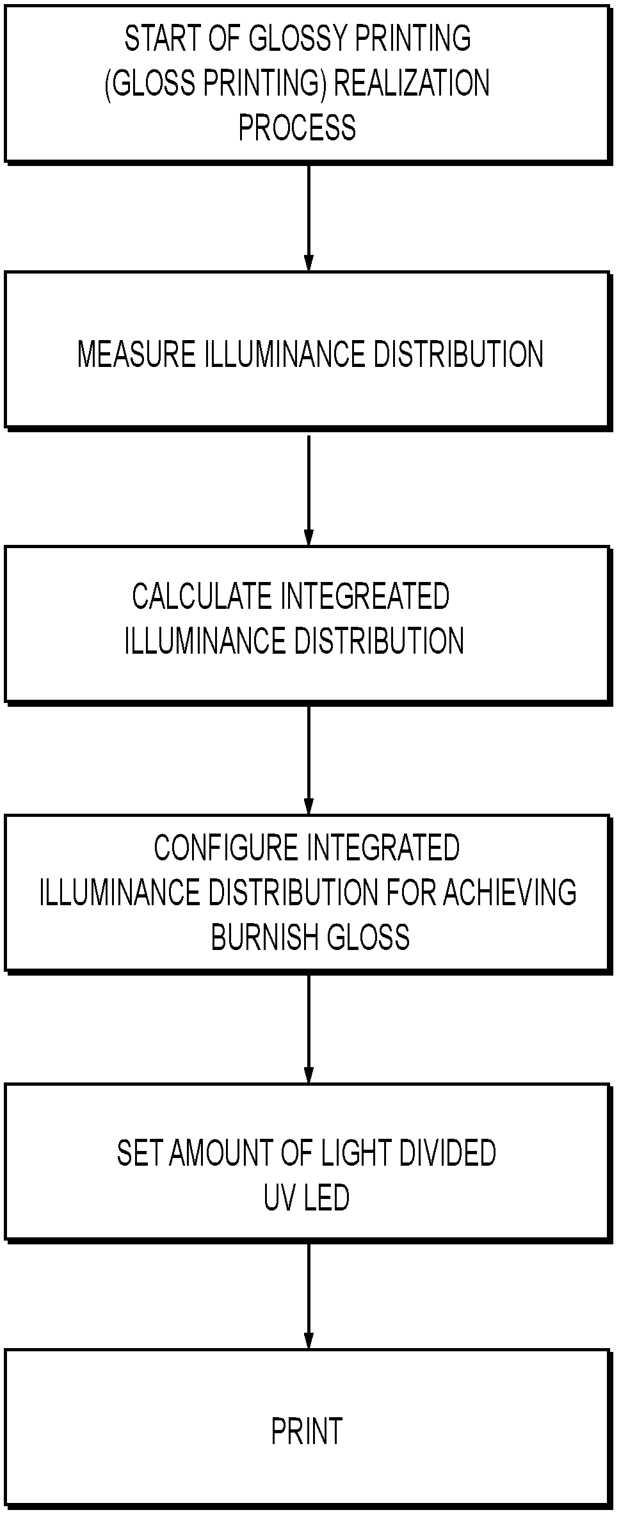
FIG. 1 is a flowchart illustrating operations of the present invention.
Figure 2:
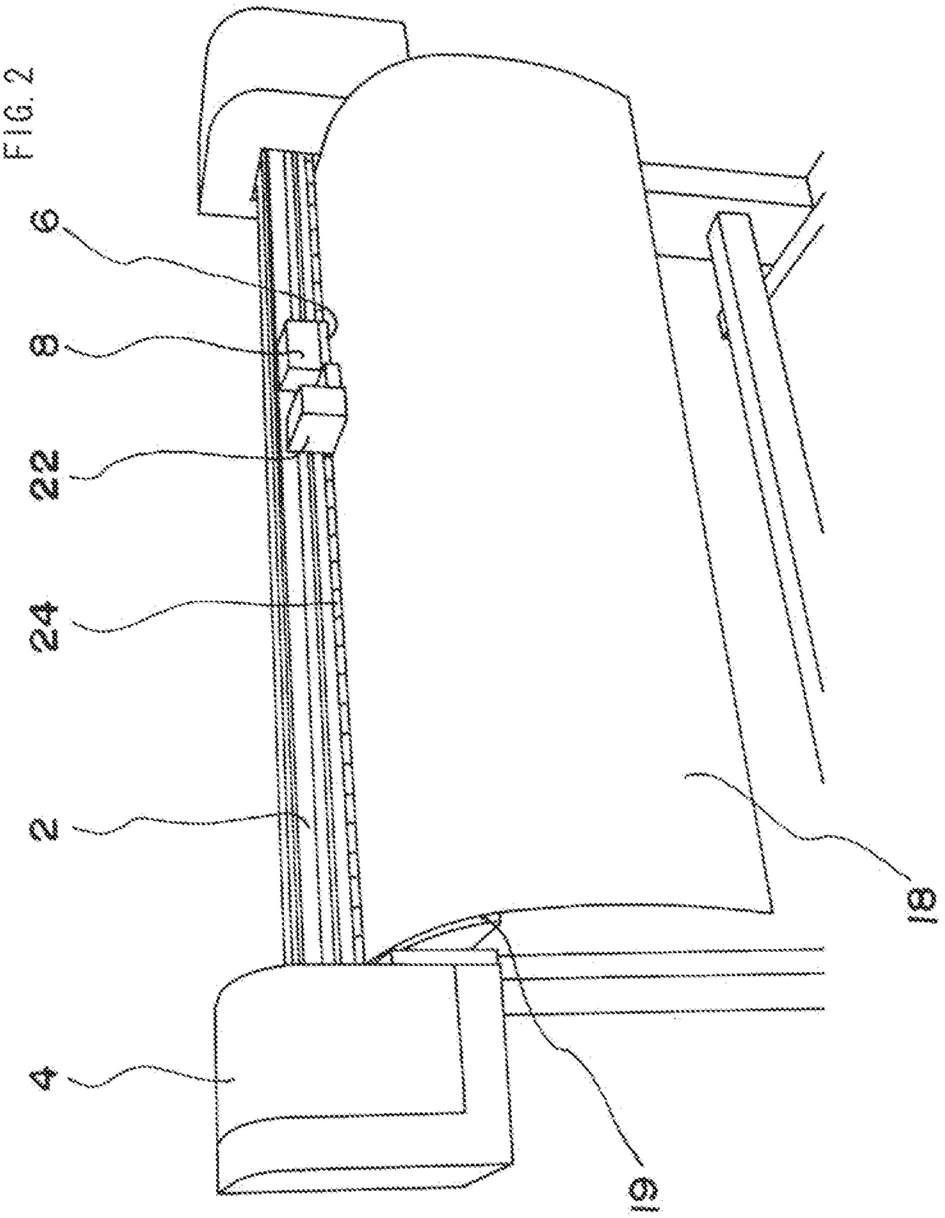
FIG. 2 is a perspective view of an ink-jet printer.
Figure 3:
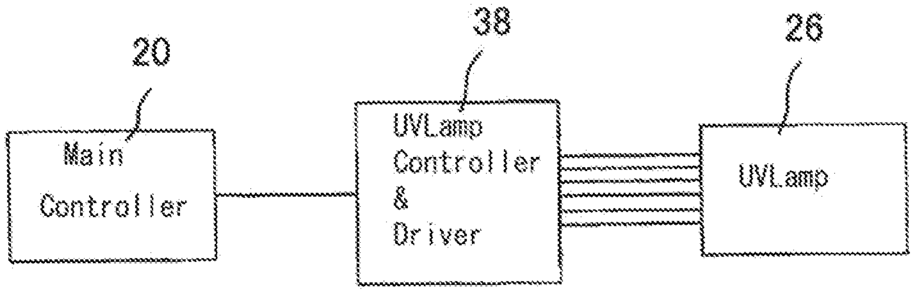
FIG. 3 illustrates a module of the present invention.
Figure 4:
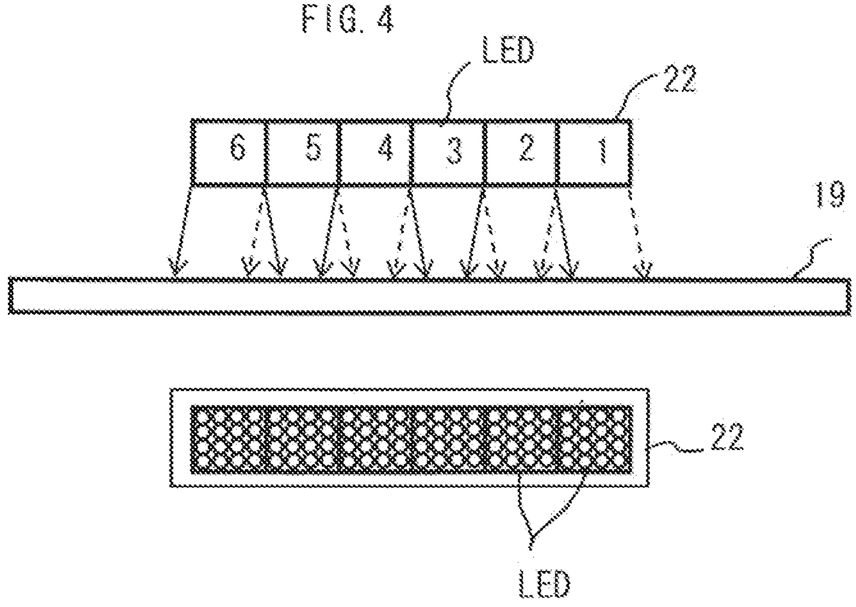
FIG. 4 illustrates the present invention.
Figure 6:
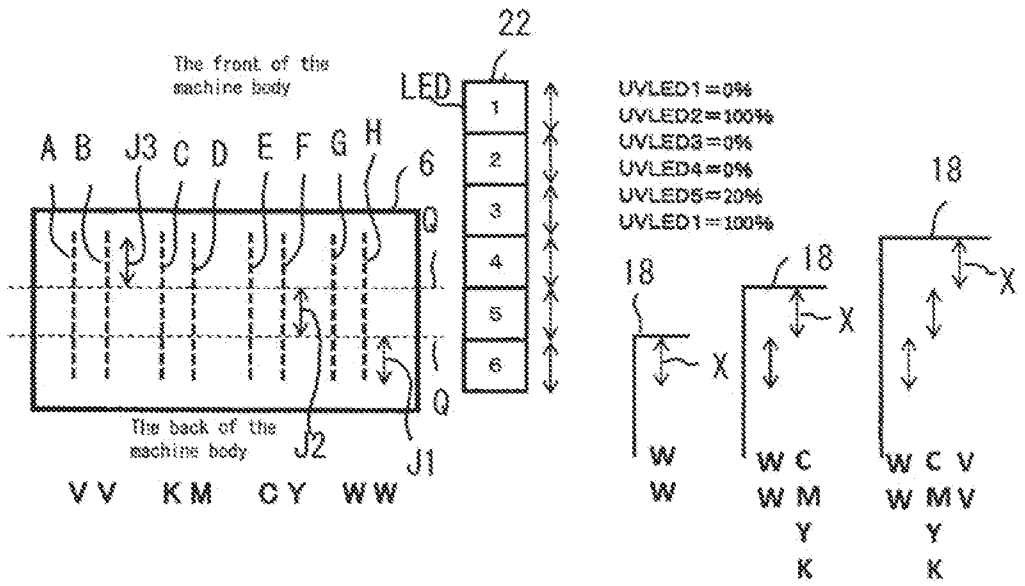
FIG. 6 illustrates the present invention.

FIG. 2 illustrates an ink-jet printer, omitting a retractable cover that shields the area around a Y rail 2. The Y rail 2 is secured to a machine body 4 through a support. Numeral 6 is a recording head, which is attached to a head part 8. The head part 8 is connected to the Y rail 2 in a reciprocating manner along the Y-rail 2, namely in the main scanning direction (Y-axis direction). As shown in FIG. 6, the recording head 6 is provided with ink discharging nozzle rows ABCDEFGH.

Nozzle rows A to H are arranged in parallel at the bottom of the recording head 6 so that their print areas in the main scanning direction overlap each other, and the entire nozzle width can be used when printing without dividing the print width. In this embodiment, an example of printing is shown where the nozzle width is divided into three sections, thereby creating predetermined print widths J1, J2, and J3 on the recording head 6. As shown in FIG. 6, the nozzle rows A to H correspond to UV-curable ink of VVKMCYWW. V indicates varnish, namely transparent ink (clear ink), K indicates black, M indicates magenta, C indicates cyan, Y indicates yellow, and W indicates white color ink.

The length of the nozzle rows that define the print width of the recording head 6 is divided into three regions corresponding to the transport width in a sub-scanning direction of a recording medium 18 such as paper, and each of these divided regions, namely each of the divided print widths J1, J2, and J3, constitutes a print range 10 (see FIG. 5A) corresponding to the transport width X (see FIG. 6) in the sub-scanning direction of a paper 18. In the head part 8, a plurality of sub-tanks for UV-curable ink are mounted, and ink is supplied to the sub-tanks by tubes from the ink carriage arranged on the side of the machine body 4. The sub-tanks and the nozzle rows A to H of the recording head 6 corresponding to them are connected via tubes.

An LED lamp 22 that illuminates ultraviolet light (UV) is connected to one side of the head part 8 through a support. A platen 19 is provided below the Y rail 2, and the recording medium (paper) 18 is arranged on the platen 19. A slit is formed in the platen 19 along the Y rail 2, and a drive roller is arranged in the slit. The paper 18 on the platen 19 is sandwiched between the drive roller and a presser roller 24 provided on the Y rail 2 side and is configured to be conveyed on the platen 19 in the sub-scanning direction at a predetermined pitch width by the rotation of the drive roller.

Figure 8:
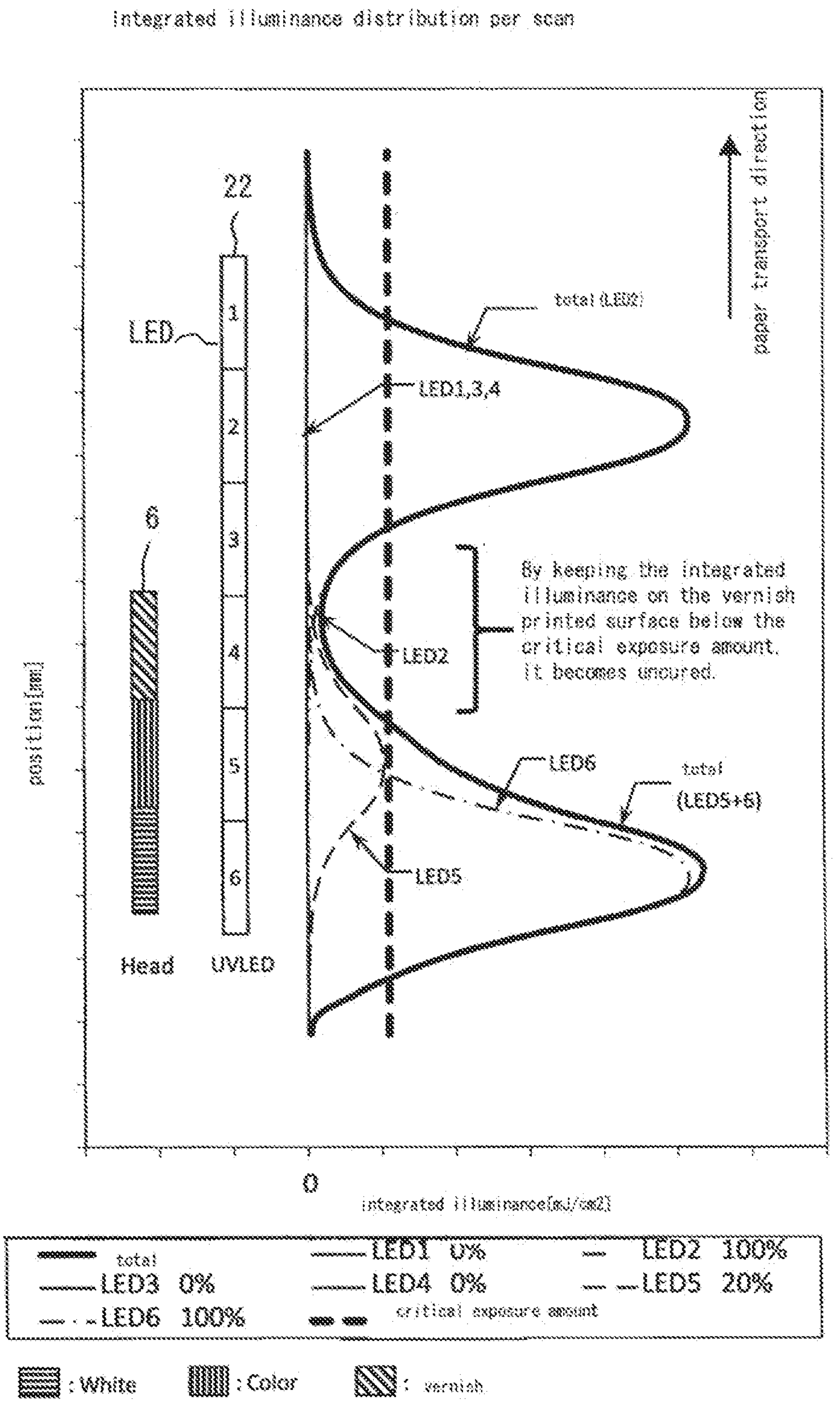
FIG. 8 illustrates the present invention.

An ultraviolet light illumination UV lamp 22 consists of six divided LEDs (ultraviolet light emitting diodes) 1 to 6 (hereinafter abbreviated as LEDs 1 to 6), each having a width that allows illumination beyond the printing area 10 in the sub-scanning direction, which are arranged opposite to the printed surface in the sub-scanning direction. As shown in FIG. 8, each LED 1 to 6 has a duty value, namely a light amount, set in the order of 0%, 100%, 0%, 0%, 20%, and 100%. Each of the divided LEDs 1 to 6 is connected to a printer's main controller 20 via a UV lamp drive control unit 38, which consists of a UV lamp controller and a driver, so that the light amount can be controlled individually, and the light amount of the UV lamp 22 is controlled between the main controller 20 and the UV lamp drive control unit. In FIG. 6, the LED 4, an area not to be cured, and the LED 5, an area to be cured, are adjacent to each other, each value is set so that the LED 5 area is cured and the LED 4 area is not cured because the LED 4 area is affected by the light diffused from the LED 5 area.

Figure 5A:
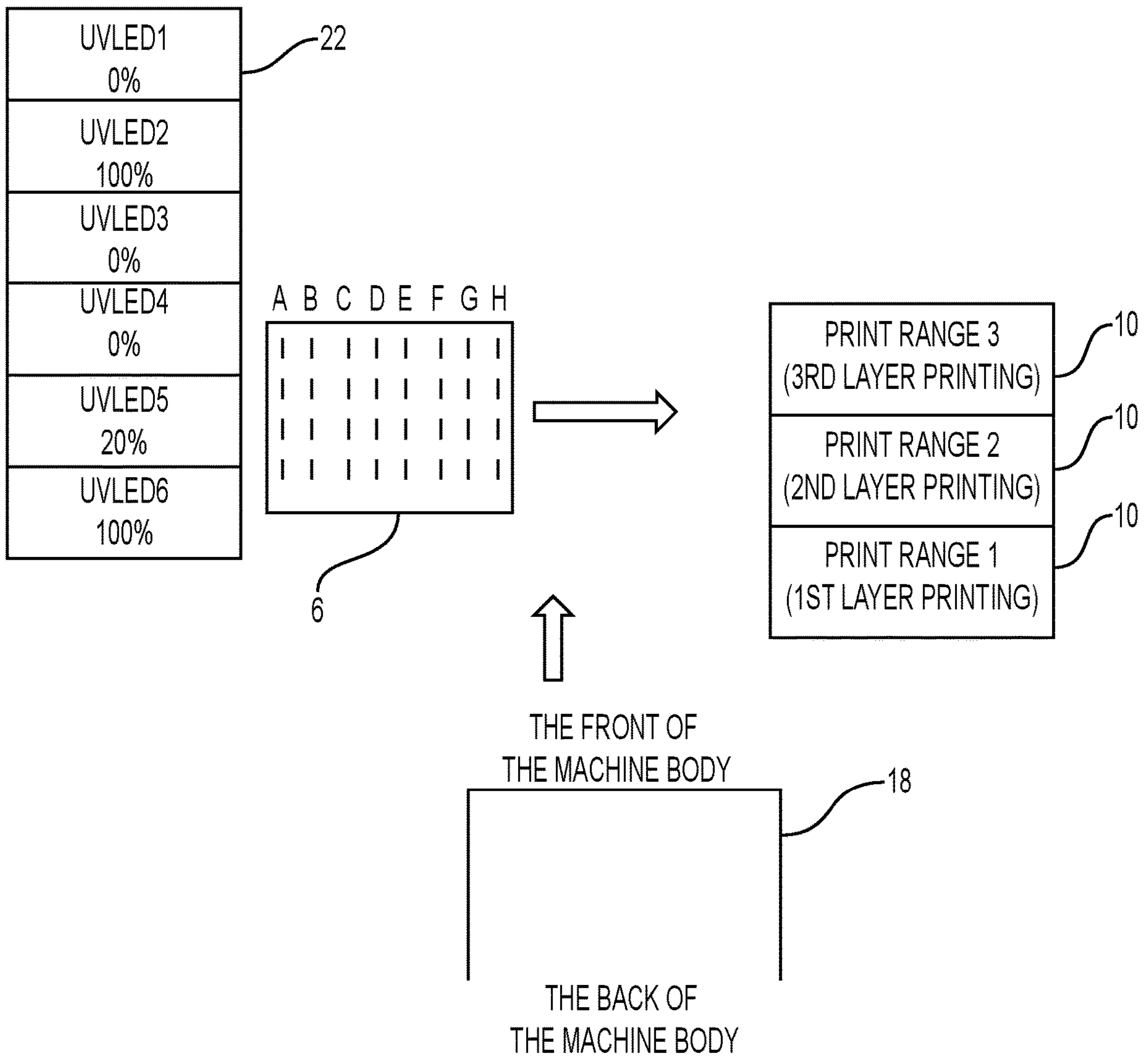
FIGS. 5(A)-5(H) illustrate the present invention.
Figure 5B:
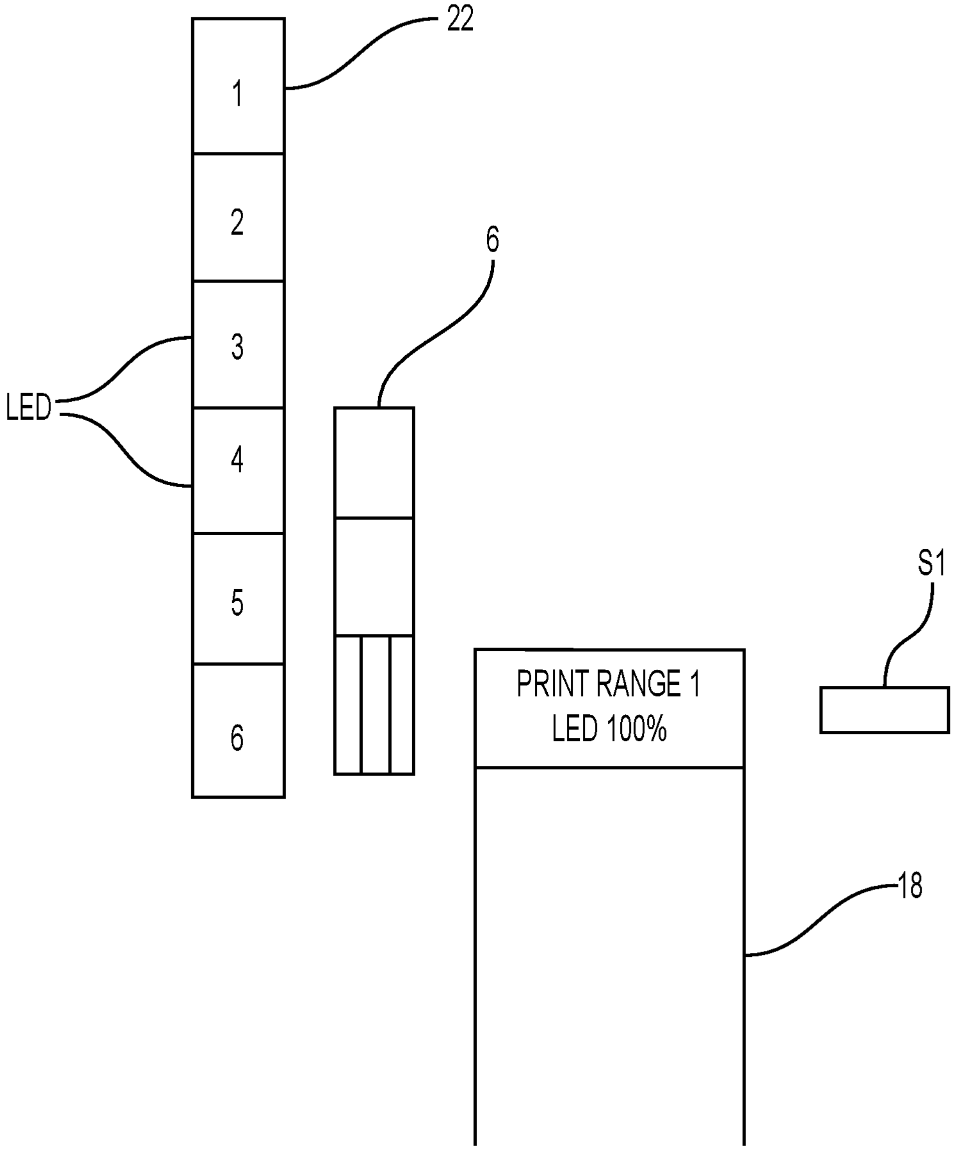

Next, printing operations of printers will be described. FIGS. 5(A) and 5(B) show a first pass printing operation of the printer. As shown in FIG. 5(A), the recording head 6 moves from a set home position of the machine to a standby position on the left side of the paper 18, discharges UV-curable ink of white W of the nozzle row GH to right (main scanning direction) from the standby position, moves while illuminating an ultraviolet light from the LED 6, and performs a first-layer printing S1 on the printing area 10 of the paper 18 with white ink (see FIG. 5B).

Next, the recording head 6 is returned to the left side standby position and the paper 18 is moved by one band.

Figure 5C:
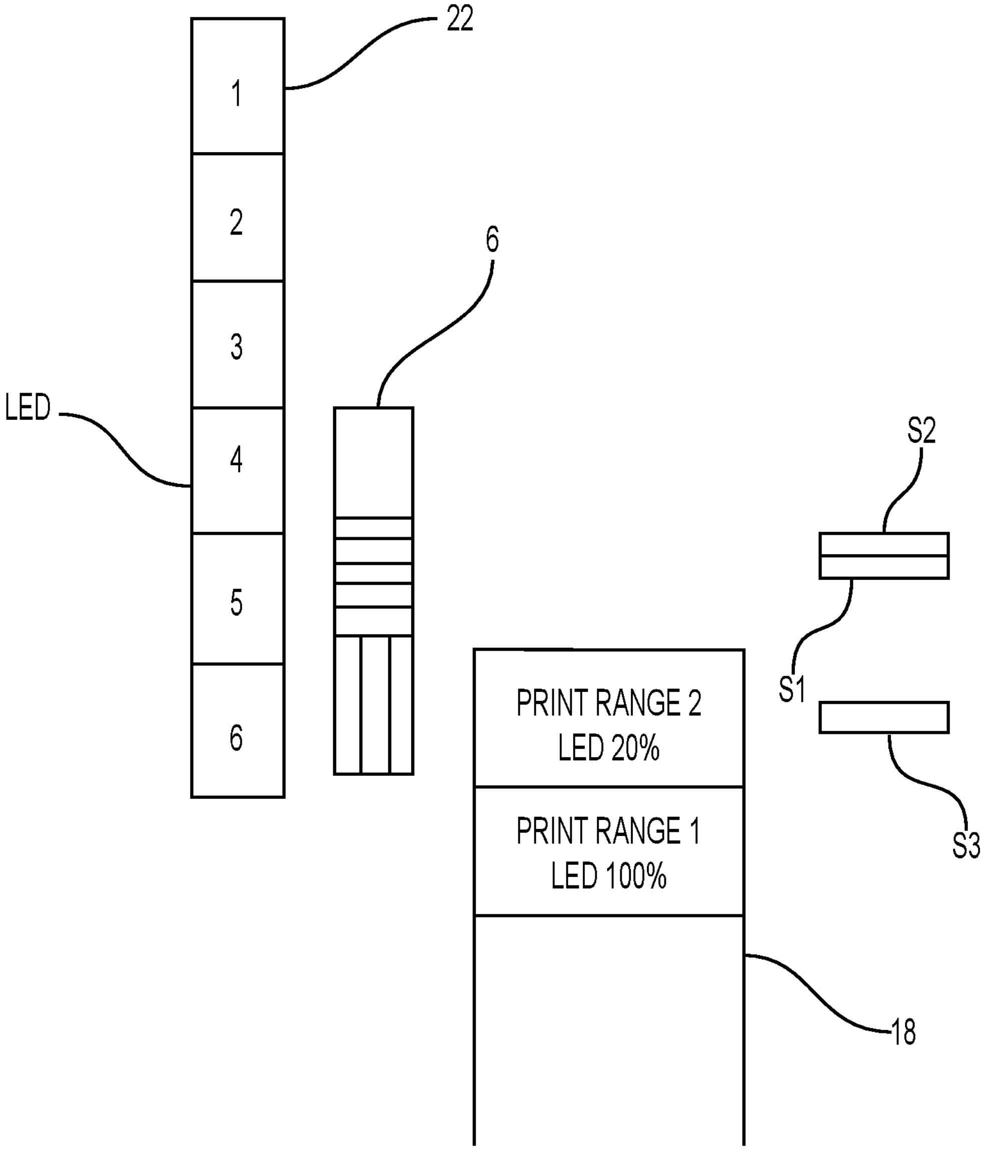

Next, the recording head 6 moves to the right, discharges KMCY ink which is a color ink of the CDEF row, and illuminates light of the LED 5 onto an ink printed surface to print a color layer on a top of a white layer. As a result, the second-layer printing S2 is performed on a printing range 2 (see FIG. 5C). At the same time, while discharging a white W ink to the printing range 1, light is illuminated from the LED 6, and a white ink is used to perform the first-layer printing S3 of the next band. In this way, the recording head 6 is sequentially scanned and ink is discharged to the recording medium 18 to print.

Figure 5D:
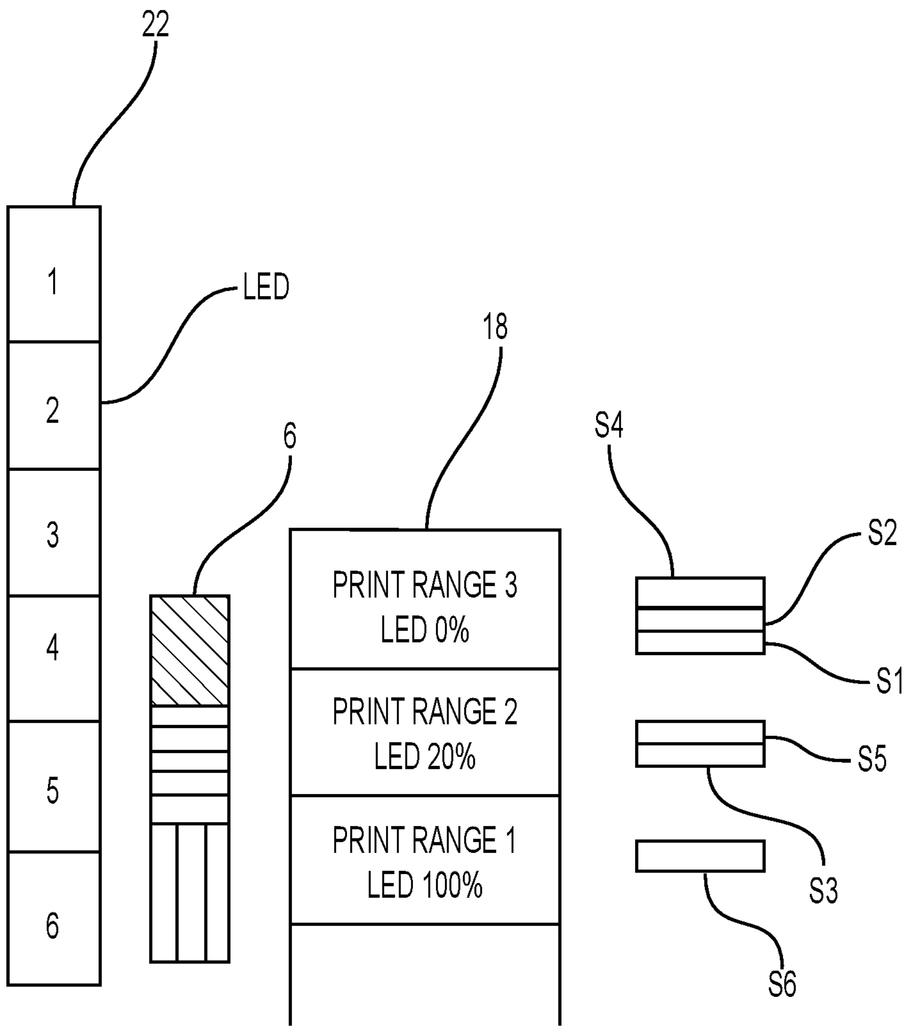
Figure 5E:
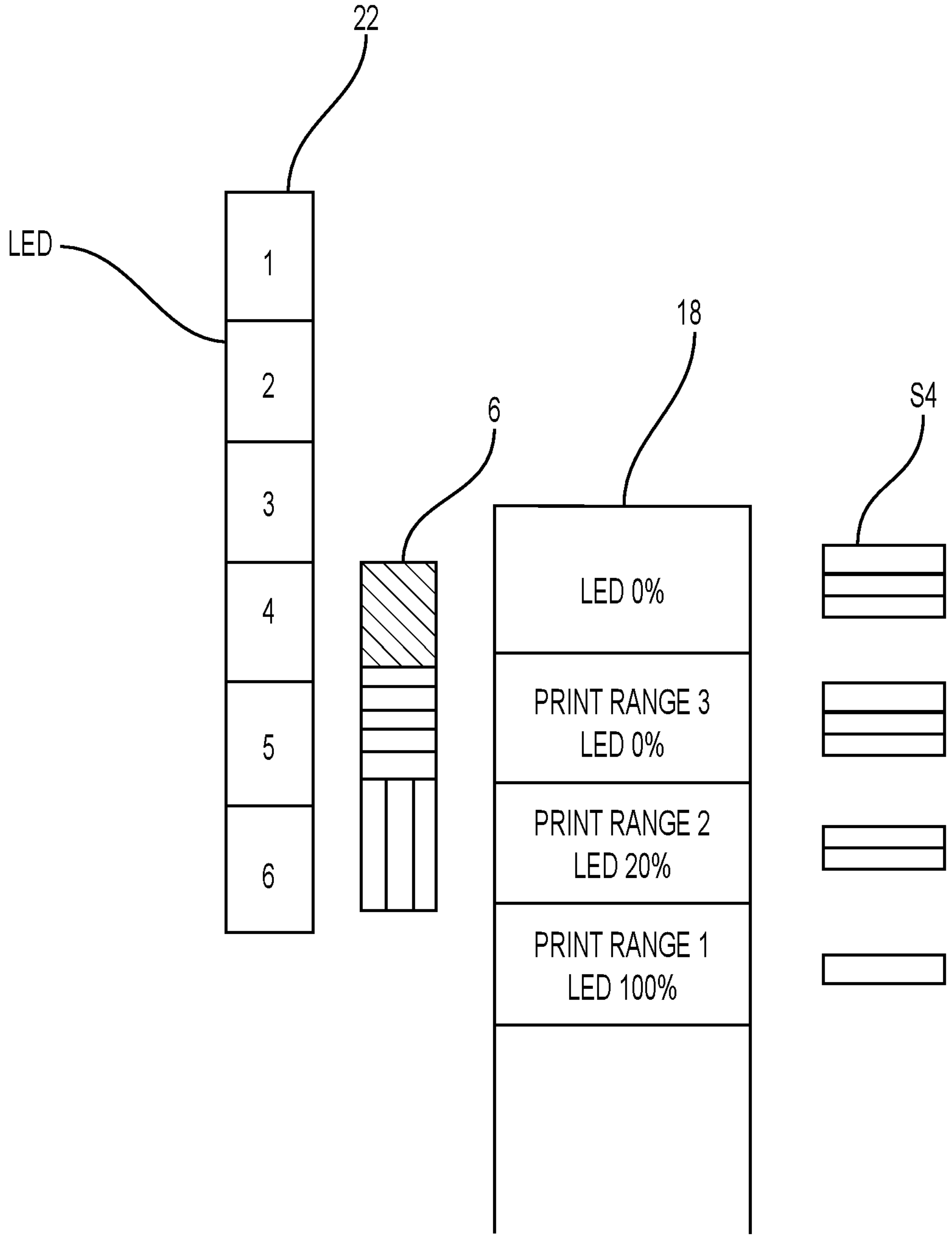
Figure 5F:
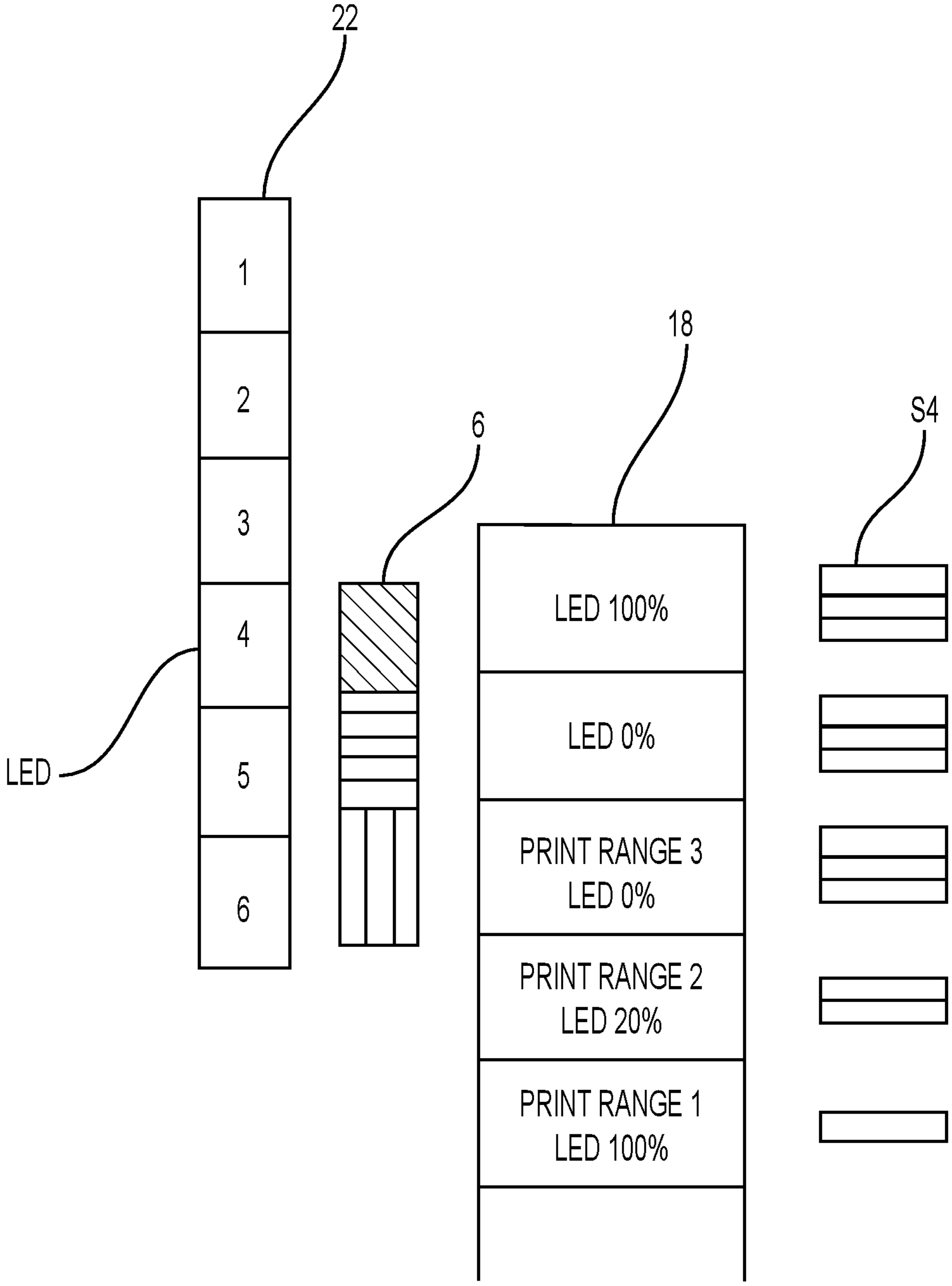
Figure 5G:
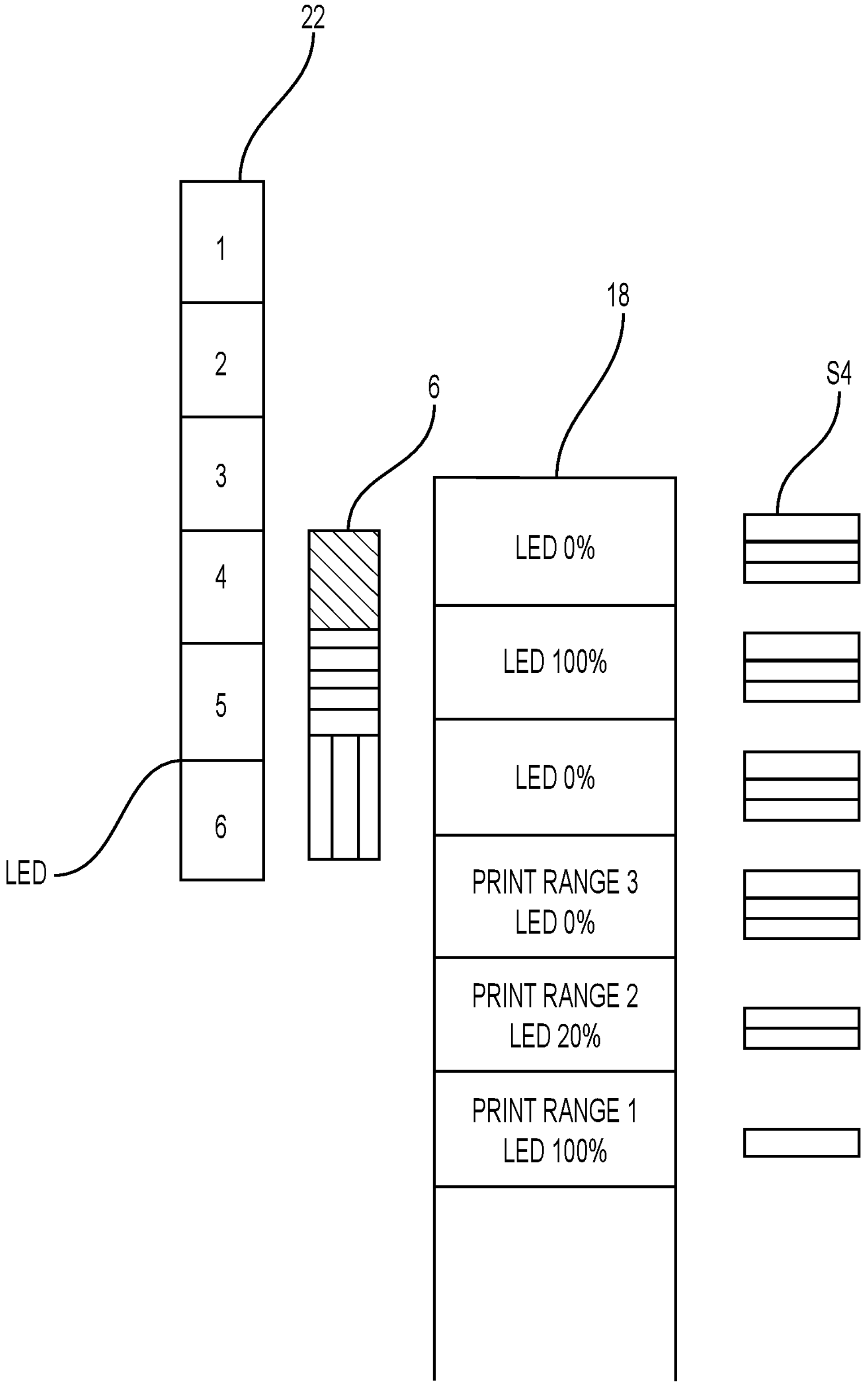
Figure 5H:
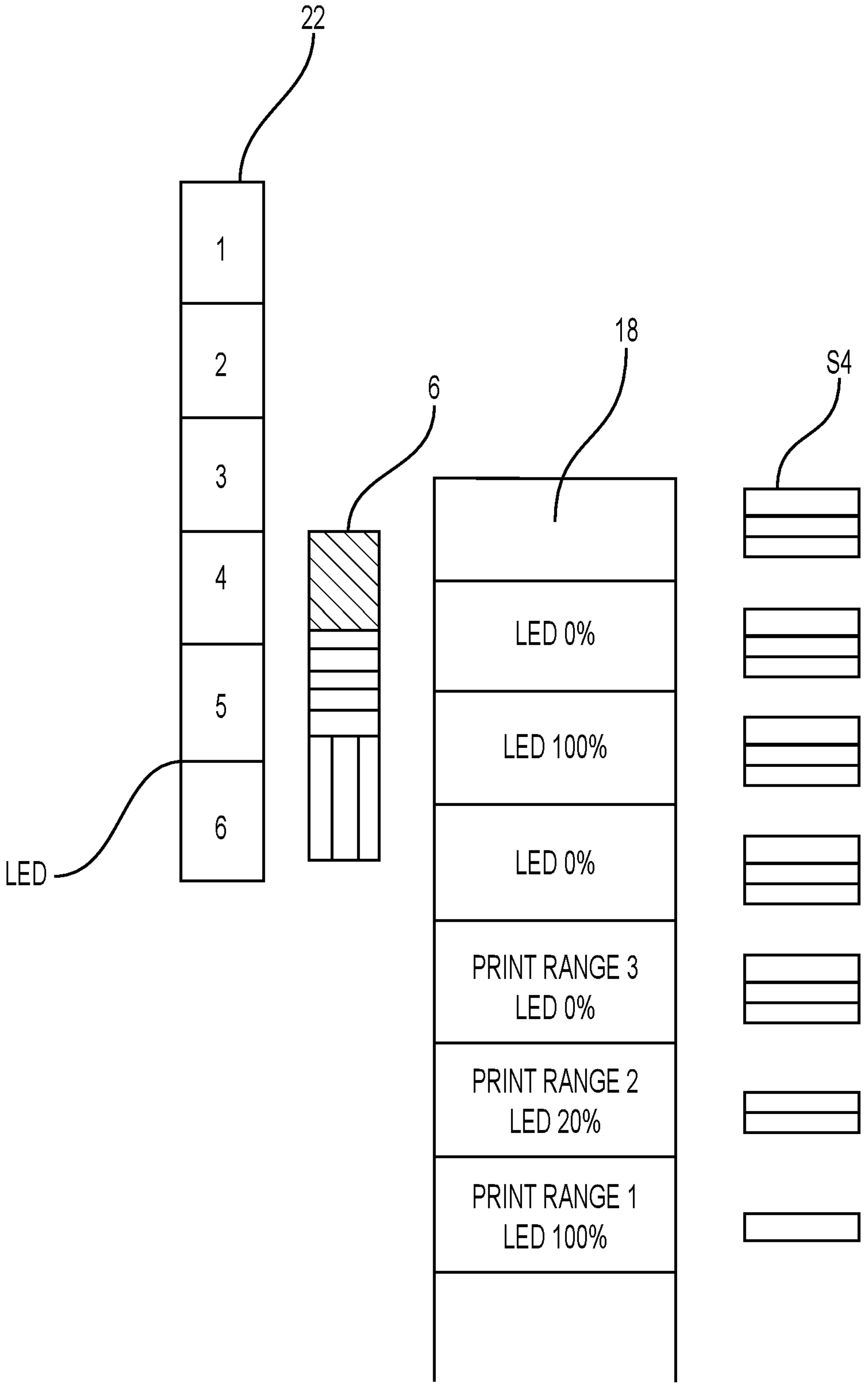

As shown in FIG. 5(D), a varnish V ink layer printing S4 is performed on top of the second-layer printed surface S2 and three layers are formed. At this time, the LED 4 corresponding to the position where the total light amount is controlled below the critical illuminance passes over the varnish printing S4. At the same time, a printing S5 of a color ink layer is performed on the printed surface of the first layer, and this ink layer is illuminated by TV light of the LED 5. At the same time, a printing S6 of the first layer is performed on the upstream-side printing area 1 with a white ink. FIGS. 5(E), (F), (G), and (H) show the printing operation by the recording head 6 and the illumination and non-illumination states of the LED on the printed surface. The duty value of the UV lamp controller of the ink-jet printer is set so that the integrated illuminance on the varnish printed surface is equal to or less than the critical exposure amount.

By adjusting the integrated illuminance on the printed surface of each LED lamp to be lit, and by setting the integrated illuminance immediately after printing on the varnish printed surface, namely the top-layer printed surface, to less than the critical exposure amount, the curing of the top-layer printed surface immediately after printing is prevented, and the glossy surface of the top-layer printed surface can be obtained. The critical exposure amount to prevent curing immediately after varnish ink printing can be experimentally determined from the curing characteristic curve (see FIG. 11).

Next, the process of achieving glossy printing of an ink-jet printer for multi-layer printing will be described.

First, an illuminance measurement device is prepared to measure the illuminance of the LED lamp 22 of the ink-jet printer with respect to the printed surface, and this is used to measure the illuminance distribution of each LED 1 to 6 with respect to the printed surface (process P1).

Figure 7:
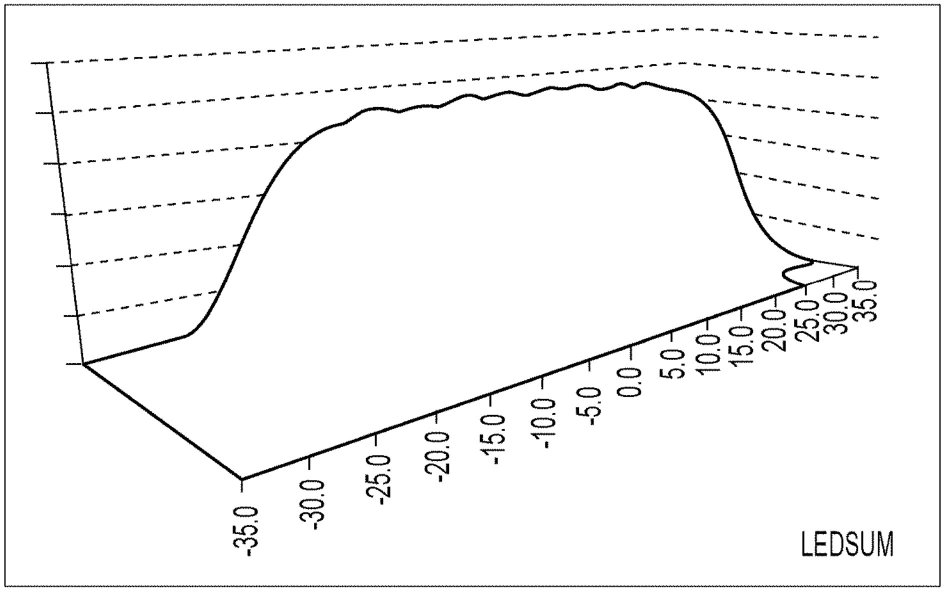
FIG. 7 illustrates the present invention.
Figure 7:
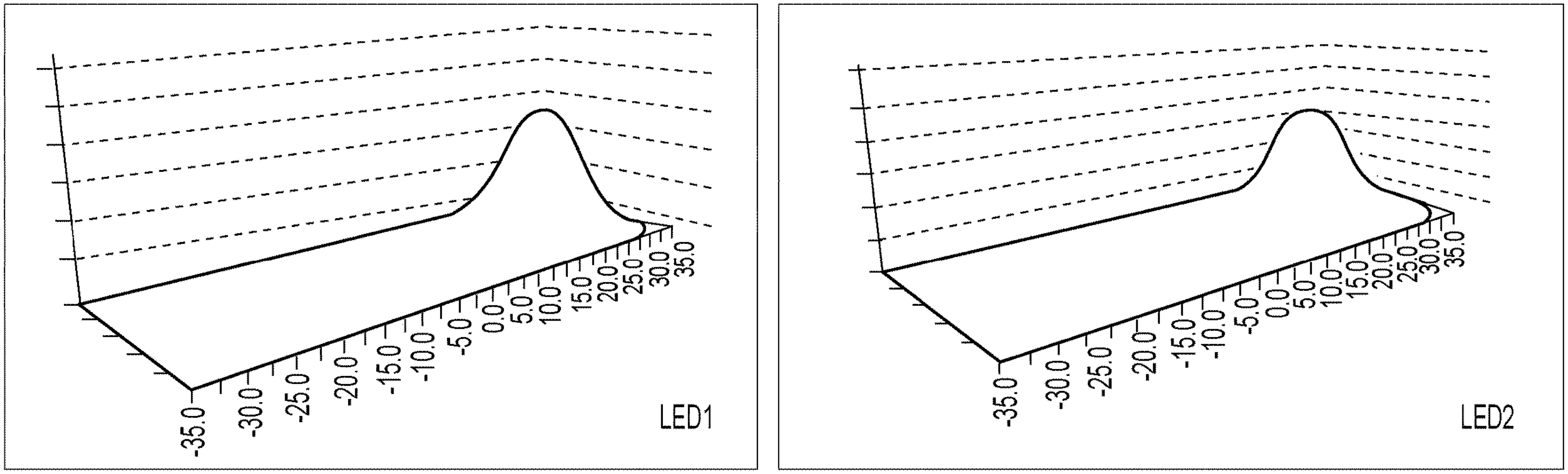
Figure 7:
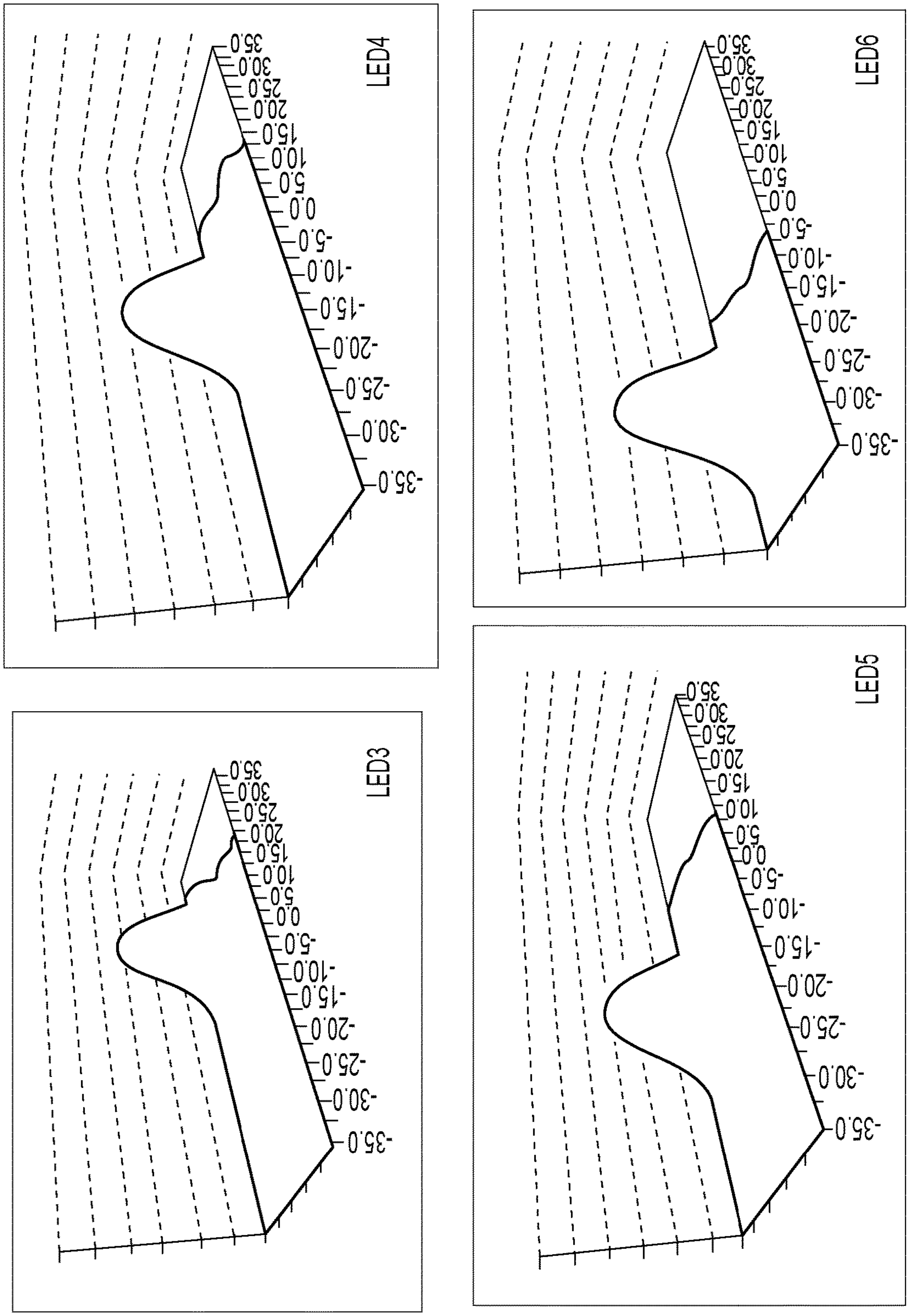

In the process P1, a test ink-jet printer is used as basic data for obtaining the integrated illuminance of the LEDs 1 to 6, and the illuminance distribution on the printed surface of each LED for which the initial value is set is measured as a duty value. At this time, the illuminance on the printed surface is measured to the extent that the distribution can be grasped. FIG. 7 shows the illuminance distribution on the printed surface corresponding to each LED. The illuminance values of the modules are measured at intervals that allow the distribution to be grasped. In the figure, the horizontal axis shows the measurement position and interval, and the vertical axis shows the relative illuminance values. The LEDSUM in FIG. 7 shows the distribution diagram of the sum of the illuminance values on each module corresponding to LEDs 1 to 6.

Next, the process moves to the process P2 to calculate the integrated illuminance distribution. The illuminance distribution data obtained in the process P1 is taken into the calculation software and integrated numerically in the UV lamp 22 scanning direction, taking into account the duty value and the scanning speed of the UV lamp 22.

Figure 10:
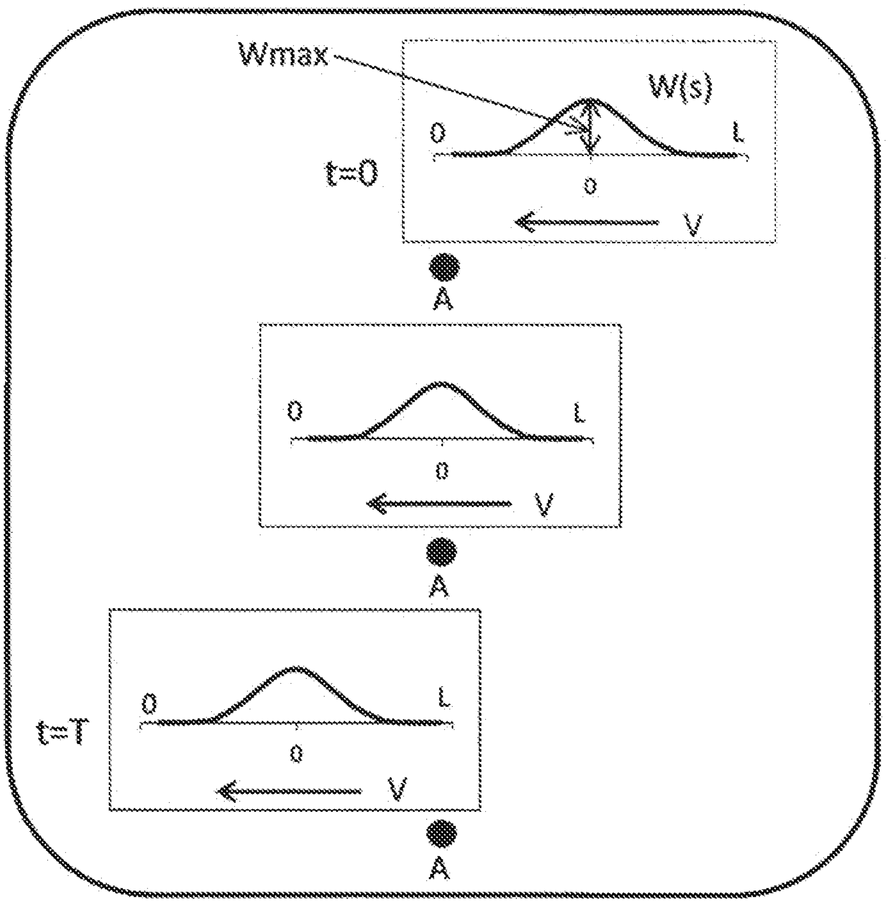
FIG. 10 illustrates the present invention.

The experimental illuminance distribution of each module (printed surface) corresponding to the LED is formed like a normal distribution that changes depending on the position as shown in FIG. 7. The integrated illuminance on a certain fixed point A is obtained assuming that the LEDs 1 to 6 are moving at a speed V. FIG. 10 shows how the LED moves from right to left. The integrated illuminance E at the fixed point A can be simply obtained by Wmax×T, when assuming that the maximum illuminance is Wmax and the LED passing time is T.

In reality, however, the illuminance is distributed like W(s). Therefore, illuminance changes during movement. Therefore, in order to obtain the integrated illuminance correctly, it is necessary to use the actually measured illuminance distribution data while considering this change. In the figure, the measured illuminance distribution data is shown as W(s), where s represents the position and the range is s=0 to L.

The LED moves at a constant speed V, and the illuminance distribution W (s) s=0, L The time when the position of L passes through the fixed point A is 0 and T. The time to pass through the LED is T. Since the position at time t is V×t, if the illuminance at that time is W(V×t) using the following Formula 1, the illuminance change can be considered.

$$E = \int_0^T W(Vt)dt \qquad \text{[Formula 1]}$$

The measured illuminance distribution data is used in this integral calculation. However, since W(s) is a position variable, if it is converted from S=Vt, it is necessary to consider the duty value more than in Formula 2 below.

[Formula 2]

$$dt = \left(\frac{dt}{ds}\right)ds = \left(\frac{1}{V}\right)ds \qquad ①$$

so it is necessary to take the product of S=Vt and W(s), which becomes Formula 3 below.

[Formula 3]

$$E = \frac{1}{V}\int_0^L W(s)ds \cdot \text{Duty value} \qquad ②$$

Based on the value (2), the calculation is performed directly using the measured illuminance distribution data W(s). Furthermore, in performing the calculation in (2), an interpolation curve is created internally and used for calculation so that values can be obtained at arbitrary points other than the measurement points of the measured illuminance distribution data W (s), although they are approximate values. Using this method enables a value of ds to be made smaller than the measurement point interval and to obtain a more accurate value. The calculation of the distribution of each LED is obtained as described above, with enough intervals in the sub-scanning direction (paper feed direction) that the distribution can be easily confirmed. The overall distribution of the LED lamp 22 is obtained as the sum of the distributions of each divided LED.

Next, the process moves to the process P3 to configure the integrated illuminance distribution to achieve the gloss of varnish.

Using the data obtained in the processes 1 and 2 above, the integrated illuminance distribution for smoothing (leveling) the printed surface of varnish ink is configured by adjusting the duty value of each LED. The adjustment procedure is as follows.

Step 1: Using the illuminance distribution data, the integrated illuminance distribution of each LED at each LED duty value is calculated using computer software.

Step 2: The integrated illuminance distribution of each LED is summed to obtain the integrated illuminance distribution of the entire LED lamp.

Step 3: Whether or not the overall integrated illuminance distribution to achieve varnish gloss is below the critical exposure amount at the varnish ink printing position, and after this, the lamp is above the illuminance at which the ink cures are confirmed.

Step 4: If the critical exposure amount is not less than or equal to the critical exposure amount, the step is returned to Step 1. If the critical exposure amount is reached, the adjustment of the duty value of each LED is completed.

FIG. 8 shows the integrated illuminance distribution per scan of the LED.

Through the above steps, the LED lamp 22 is lit and the integrated illuminance (light amount) of each divided LED is adjusted so that the initial illumination to the varnish ink printed surface is suppressed to the critical exposure amount or less, and the set value is input to the printer control software that controls the controller 20 of the ink-jet printer (process 4) to perform printing of the ink-jet printer with the set value (process 5).

Figure 11:
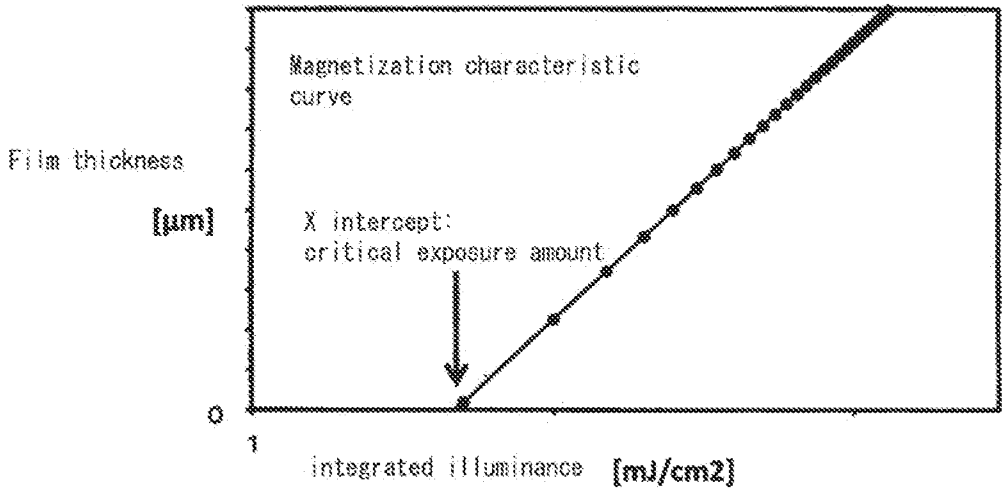
FIG. 11 illustrates the present invention.

In printing on the basis of the above settings, varnish ink does not cure immediately after printing, and gloss is obtained on the printed surface. UV ink has a certain relationship between the horizontal axis and the integrated illuminance and the vertical axis and the film thickness, as shown in FIG. 11, which is called the curing characteristic curve. The critical exposure amount refers to the X-intercept of this curve and represents the minimum exposure amount required to cure the UV ink. On the contrary, if it is less than this exposure amount, it means that it will not be cured. Therefore, the value of the critical exposure amount of the varnish ink is used to turn on the divided LED and set the light amount, and the integrated illuminance on the varnish printed surface is adjusted so that it is below the critical exposure. By setting the duty values of the LEDs 2, 5 and 6 other than turning off the light, a "distribution" of the integrated illuminance for spreading the light can be obtained. Then, the distribution changes according to the duty value. Further, since the critical exposure amount of the varnish ink is exceeded by the illumination of the LED, it is cured with gloss (glossy surface).

Figure 9:
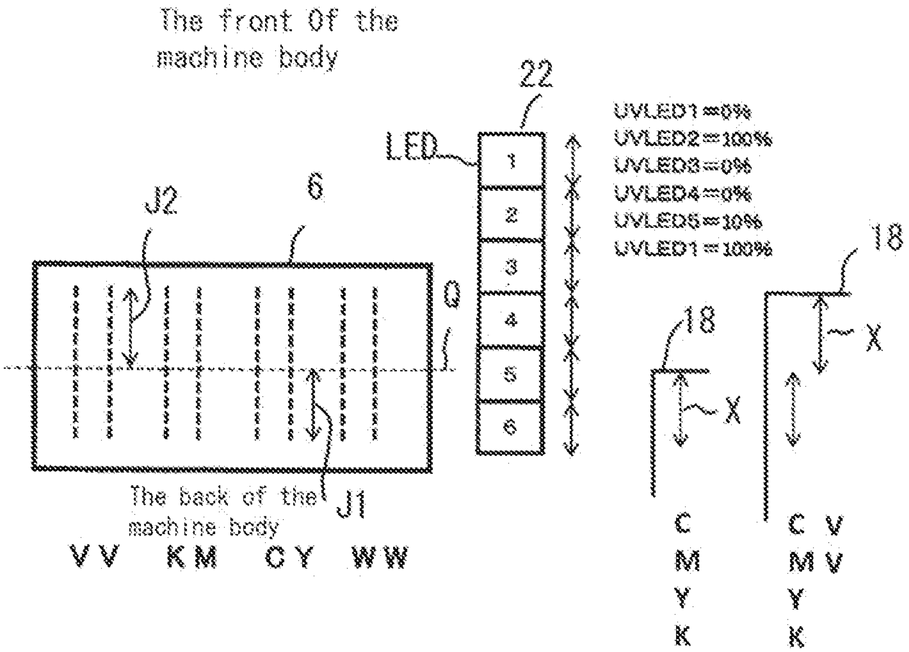
FIG. 9 illustrates another embodiment of the present invention.

The above embodiment shows an example of an ink-jet printer in which the ink discharge nozzle row of the recording head 6 is divided into three sections in the sub-scanning direction and six divided LEDs 1 to 6 are provided for three-layer printing. However, the present invention is not particularly limited to the printing method of this ink-jet printer. As shown in FIG. 9, cases in which the recording head 6 is divided into two sections as shown in J1 and J2, or the dividing line Q of the recording head 6 and the boundary line between the divided LEDs are misaligned, or two-layer printing is performed, and the like are included and the number of ink discharge range divisions and the number of printing layers of the recording head 6 are not limited to those shown in this embodiment. Furthermore, in the case where the recording head 6 shown in FIG. 9 is divided into J1 and J2, the boundary between the color ink and the varnish ink is located in the middle of the illumination area of the UVLED 5, so that a setting value in which the color ink part is cured and the varnish ink part is not cured is used. Furthermore, the light amount control of the divided LED is not particularly limited to the PWM control, and current control and the like can be used.

In addition, although the present embodiment describes the surface gloss of varnish (transparent clear ink) printed surfaces, the LED lamp control of surface gloss of the present invention is not specifically limited to varnish printed surfaces, and can be also applied to the realization of surface gloss of UV-cured color ink printed surfaces. The terms "varnish ink" and "clear (transparent) ink" in the present invention refer to transparent or translucent inks such as varnish, gloss, etc., which are mainly used to protect the surface of printed materials or to control the gloss of printed materials, but are not limited to them. In this example, the explanation is provided on the basis of an example in which a single nozzle row is divided into multiple nozzle rows for the discharge printing range of the inkjet printhead, but a structure in which the nozzle rows are shifted horizontally and arranged vertically may also be used, as long as the structure allows control of the printing range.

Although the present invention utilizes a UV lamp (illumination device) with an ultraviolet light-emitting diode, any device that can illuminate and cure light-curing inks is acceptable. Further, in the present invention, a plurality of parameters corresponding to the printing specifications are retained so that even if the printing width of the ink-jet printer is changed, the parameters are automatically changed according to the printing specifications.

Since the curing characteristics of the inks used in ink-jet printers may differ from one another, settings for multiple inks may be stored, and when the ink used is changed, the settings for the ink used may be used.

DESCRIPTION OF REFERENCE NUMERALS

- 2 Y rail
- 4 Machine body
- 6 Recording head
- 8 Head part
- 18 Paper
- 19 Platen
- 20 Main controller
- 22 LED lamp
- 24 Presser roller

What is claimed is:

1. A illumination control method of LED lamps for ink-jet printers, comprising:

a recording head in which a plurality of ink discharge printing ranges are formed in a printing direction and an LED lamp in which a plurality of light emitting diodes are arranged at the rear side of the recording head with respect to the printing direction, wherein in an ink-jet printer in which the light-emitting diodes are divided into plural areas and the light amount for each area can be individually controlled by a controller, and among the light-emitting diodes divided into plural areas, the light amount of the light-emitting diode that first scans a glossy printed surface is set to a light amount that does not cause ink curing, the light amount of the light-emitting diode of the area that first scans is set so that the total light amount on the glossy printed surface is less than or equal to the critical exposure amount of the integrated illuminance.

2. The illumination control method of LED lamps for ink-jet printers according to claim 1, wherein the LED lamps are UVLED lamps using ultraviolet light-emitting diodes.

3. The illumination control method of LED lamps for ink-jet printers according to claim 1, wherein the LED lamp has an illumination range that extends longer in the printing direction than the recording head, and makes curing beyond the critical exposure amount by the total amount of integrated illuminance in scanning after transportation.

4. The illumination control method of LED lamps for ink-jet printers according to claim 1, wherein the light amount of the light emitting diode in the area adjacent to the light emitting diode in the first area to be scanned is set below the critical exposure amount.

5. The illumination control method of LED lamps for ink-jet printers according to claim 1, wherein the glossy printed surface is formed with a clear ink and one or more ink layers are formed under the clear ink layer.

6. The illumination control method of LED lamps for ink-jet printers according to claim 1, wherein the critical exposure amount is the minimum exposure amount required to cure the UV-curable ink and is set on the basis of the curing characteristic curve of the UV-curable ink.

7. The illumination control method of LED lamps for ink-jet printers according to claim 1, wherein the setting of the light amount of the light-emitting diodes divided into a plurality of areas is carried out through: a first process of measuring the illuminance distribution on a printed surface of each of the divided light-emitting diodes by driving an LED lamp of a test ink-jet printer; a second process of obtaining the integrated illuminance distribution on the printed surface of each of the divided light-emitting diodes using the data measured in the first process and the integrated illuminance distribution on the printed surface of the entire LED lamps obtained by summing these; a third process of adjusting the illuminance of each of the divided light-emitting diodes on the printed surface on the basis of the integrated illuminance distribution; and a fourth process of setting the light amount of each of the divided light-emitting diode in such a way that the integrated illuminance on a gloss-printed surface is no greater than a critical amount of exposure.

8. The illumination control method of LED lamps for ink-jet printers according to claim 7, wherein the LED lamps are UVLED lamps using ultraviolet light-emitting diodes.

9. The illumination control method of UVLED lamps for ink-jet printers according to claim 8, wherein the critical exposure amount is obtained on the basis of the curing characteristic curve of the UV-curable ink.

* * * * *